US007724836B2

(12) United States Patent
Hartmann et al.

(10) Patent No.: US 7,724,836 B2
(45) Date of Patent: May 25, 2010

(54) METHOD AND RECEIVING UNIT FOR COMPENSATION FOR A FREQUENCY OFFSET AND/OR FOR A CHANGE IN THE PHASE OF A TRANSMISSION CHANNEL OVER TIME BY RECEIVER-END EVALUATION OF EDGE SYMBOLS OF A RECEIVED DATA BURST

(75) Inventors: Ralf Hartmann, München (DE);
Martin Krüger, München (DE);
Hartmut Wilhelm, München (DE)

(73) Assignee: Infineon Technologies AG, Munich (DE)

( * ) Notice: Subject to any disclaimer, the term of this patent is extended or adjusted under 35 U.S.C. 154(b) by 992 days.

(21) Appl. No.: 10/935,447

(22) Filed: Sep. 7, 2004

(65) Prior Publication Data

US 2005/0089115 A1   Apr. 28, 2005

(30) Foreign Application Priority Data

Sep. 5, 2003   (DE) ................................ 103 41 107

(51) Int. Cl.
*H04B 15/00* (2006.01)
(52) U.S. Cl. ...................... 375/285; 375/346; 375/284; 375/324; 329/353; 329/320
(58) Field of Classification Search ................. 375/285, 375/326, 344, 346, 284, 324; 329/353, 320, 329/318
See application file for complete search history.

(56) References Cited

U.S. PATENT DOCUMENTS

| 5,471,501 | A  | * | 11/1995 | Parr et al. ................... 375/354 |
| 6,459,888 | B1 | * | 10/2002 | Clark ......................... 455/266 |
| 6,714,609 | B1 | * | 3/2004 | Keisala ....................... 375/349 |
| 7,012,973 | B1 | * | 3/2006 | Piirainen .................... 375/340 |
| 7,065,371 | B1 | * | 6/2006 | Kleinerman ................. 455/464 |
| 2004/0252789 | A1 | * | 12/2004 | Sundaralingam ............ 375/336 |
| 2005/0147188 | A1 | * | 7/2005 | Liu ............................ 375/326 |

FOREIGN PATENT DOCUMENTS

| DE | 100 43 743 A1 | 3/2002 |
| WO | WO 00/54431 A1 | 9/2000 |

* cited by examiner

*Primary Examiner*—David C Payne
*Assistant Examiner*—Rahel Guarino
(74) *Attorney, Agent, or Firm*—Eschweiler & Associates, LLC (57) ABSTRACT

In order to compensate for a frequency offset or a change in the phase of the transmission channel over time during mobile radio transmission of data symbols, the data symbols are transmitted by way of carrier-frequency, modulated data bursts. Sample values of the received signal, which are known in advance and correspond to first and second symbols, are evaluated in order to estimate the frequency offset or the change in the phase of the transmission channel over time. These first and second symbols are transmitted with a defined phase angle by way of the data burst, and are arranged separated from one another in the data burst. Edge symbols in a data burst are advantageously used as first and second symbols, or as a symbol pair, for estimation.

23 Claims, 2 Drawing Sheets

FIG 1

(PRIOR ART)

FIG 2

METHOD AND RECEIVING UNIT FOR COMPENSATION FOR A FREQUENCY OFFSET AND/OR FOR A CHANGE IN THE PHASE OF A TRANSMISSION CHANNEL OVER TIME BY RECEIVER-END EVALUATION OF EDGE SYMBOLS OF A RECEIVED DATA BURST

REFERENCE TO RELATED APPLICATIONS

This application claims the benefit of the priority date of German application DE 103 41 107.0, filed on Sep. 5, 2003, the contents of which are herein incorporated by reference in their entirety.

FIELD OF THE INVENTION

The invention relates to a method for compensation for a frequency offset and/or for a change in the phase of a transmission channel over time during mobile radio transmission of data symbols. The invention furthermore relates to a receiving unit for mobile transmission of data symbols, by means of which a frequency offset and/or a change in the phase of the transmission channel over time are/is estimated and compensated for.

BACKGROUND OF THE INVENTION

In a mobile radio system, radio-frequency, digitally modulated signals are transmitted between mobile stations and base stations. When data symbols are being transmitted in this manner via a mobile radio channel, a number of error sources may occur which, overall, determine the bit error rate, which is related to a specific transmission power. For example, one error source may comprise a small frequency error or a small frequency offset during the transmission between the transmission frequency and the reception frequency, which contributes significantly to the bit error rate and must be compensated for. This frequency offset or this frequency error means a frequency error that is caused by there being different oscillator frequencies at the transmission end and at the reception end. This discrepancy in the transmission-end and reception-end oscillator frequencies may be caused, inter alia, by manufacturing tolerances in the oscillators and oscillator crystals that are used. In particular, the oscillators which are used in mobile stations have oscillators which in some cases have relatively major frequency fluctuations, as a result of them being manufactured at as low a cost as possible.

Mobile stations normally have an apparatus that regulates the reception-end oscillator frequency such that the frequency offset that occurs on reception is as small as possible. This control, which is also referred to as AFC (automatic frequency control) cannot, however, follow minor changes in the transmission frequency without any delay, such as those which occur when a base station with units which produce a carrier frequency that changes from data burst to data burst is transmitting to a mobile station. This can lead to a rapidly changing frequency error or frequency offset, with different mathematical signs.

Furthermore, the frequency error may be influenced by the Doppler effect, since any relative movement between a mobile station and a base station leads to a frequency shift in the transmitted signals. It is therefore important to compensate for a frequency error such as this since, without any such frequency compensation, the receiver cannot demodulate the transmitted data with a sufficiently low error probability.

In some cases, a relatively low signal-to-noise ratio of less than 10 dB is used in the GSM mobile radio standard (Global System for Mobile Communications). With this mobile radio station, the noise is thus a significant error source. The GMSK modulation that is used in the GSM standard uses a signal area with the signal points +1 and −1. Since these two signal points have a phase difference of 180°, small phase errors and frequency errors lead to scarcely any increase in the bit error rate. The GSM mobile radio standard is thus relatively robust to frequency errors when using GMSK modulation.

EDGE (Enhanced Data Rates for GSM Evolution) as well as the associated EGPRS packet service (Enhanced General Packet Radio Service) have been defined as an extension to GSM. EDGE uses 8-PSK modulation. 8-PSK modulation uses a signal area with 8 signal points, with the phase difference between the individual signal points being 45°. For this reason, even small phase errors and frequency errors are disturbingly noticeable and cause a significant increase in the bit error rate.

A control loop ("Automatic Frequency Control", AFC) is used as one standard method to allow frequency correction or frequency compensation to be carried out. This control loop is used to estimate a frequency offset over a lengthy time period. This estimated frequency offset is filtered and compensated for by means of a control filter. In order to allow such estimation of a frequency offset to be carried out, the GSM radio standard provides a logical channel that is provided specifically for this purpose ("Frequency Correction Channel"). Any frequency offset can also be estimated after equalization, with the aid of the demodulated data bits. However, it should be noted that various radio standards also demand that a mobile radio receiver be tolerant to short-term frequency changes.

In the GSM mobile radio standard, the data is transmitted in data bursts, and the frequency error in one data burst may be different, or may vary differently, from the frequency error in a further data burst. The AFC control loop cannot regulate out a frequency offset such as this. In a situation such as this, it is therefore necessary to use a method that estimates and compensates for a frequency offset in a data burst.

Data that is known a priori is used for this purpose in one procedure for estimation of the frequency offset. Data that is known a priori is used as training symbols in a training sequence. A method such as this for automatic compensation for a frequency offset is known from German Laid-Open Specification DE 100 43 743 A1. Automatic frequency correction for the sample values of the received signal is carried out, in the known method, after channel estimation and before channel equalization. The frequency offset in the received signal was determined by evaluation of a cohesive sequence of sample values, which correspond to the training symbols that are transmitted centrally in the data burst. In this case "correspond" means that the only symbols that are transmitted in the data burst which influence the sample values are the training symbols.

In a further procedure, it is first of all possible to estimate all the data bits, and to use these estimated data bits, or to use them and a training sequence, to determine and compensate for a possible frequency offset. All of the data bits are then estimated once again. In a further alternative procedure, it is possible to estimate only some of the received data bits first of all. This section of the estimated data bits, or the estimated bits and a training sequence, is or are then used to estimate a frequency error, and to subsequently compensate for it. Such method procedures for determination of and compensation for a frequency error in a mobile radio system, caused by a Doppler shift, are known from WO 00/54431.

In the case of the known methods for compensation for a frequency error, either the relatively small number of symbols in a cohesive training sequence, or else data symbols that have been detected and demodulated in advance, are used as the raw data for this estimate. Frequency estimation is based on the least square error method and involves a considerable degree of arithmetic computation complexity. A further significant disadvantage of these methods is the complexity for the prior detection that is required and prior demodulation of the data symbols that are used.

The major factor relating to a frequency error is that it causes an increasing phase error in the time profile. The quality of a frequency estimate thus depends less on the amount of data than, in fact, on the position of the data within a data burst. The phase angles of the sample values which are used for estimation of a frequency error thus differ to a greater extent the further apart from one another these sample values under consideration are within the data burst. A training sequence in the GSM radio standard is formed from 26 immediately successive symbols, with these 26 symbols furthermore being located and arranged directly in a row in the centre of the data burst, so that a training sequence such as this is not suitable for precise estimation of a frequency error. The data bits which are adjacent to the training sequence on both sides of it could likewise be used for estimation of a frequency offset, but would first of all have to be detected and demodulated in order to make it possible to calculate a frequency error based on them. Both methods are thus relatively unsuitable for estimation of a frequency error, since they are either relatively inaccurate or else can be carried out only with considerable effort and with great uncertainty, and thus lead to a relatively inaccurate estimate of a frequency error. Compensation for the frequency error is thus only relatively inaccurate, and is complex to carry out.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention is directed to a method for receiver-end compensation for a frequency offset and/or for a change in the phase of a transmission channel over time in mobile radio transmission. The invention further provides a receiving unit for mobile radio transmission, in which a frequency offset and/or a change in the phase of a transmission channel over time can be determined accurately, and in which the information used for this purpose can be obtained quickly and with little effort.

In the case of a method according to the invention for receiver-end compensation, in particular for automatic compensation, for a frequency offset and/or for a change in the phase of the transmission channel over time during mobile radio transmission of data symbols, the data symbols are transmitted by means of carrier-frequency, modulated data bursts. One aspect of the invention is that known first and second symbols and/or symbol sequences, which are referred to for short in the following text as first and second symbols are transmitted with a defined phase angle by means of the data burst at specific times at the receiver end, and these first and second symbols are arranged separated from one another in the data burst. Those parts of the received signal which correspond to the first and second symbols are used to compensate for the frequency offset and/or for the change in the phase of the transmission channel over time, at least in the burst in which they were received. In general, compensation in this case refers to all measures that contribute to fewer errors occurring during the reception of signals. Compensation thus also covers all those measures that improve the reception quality and reduce the error probability in the receiver.

The method according to the invention makes it possible to compensate for a frequency offset and/or for a change in the phase of the transmission channel over time very accurately. Since the first and second symbols are not arranged centrally successively in a data burst, but are arranged separated by a relatively long interval from one another in the data burst, this distance makes it possible to determine relatively major differences in the reference phase angles of the first and second sample values, thus resulting in more accurate determination of the frequency offset and/or of the change in the phase of the transmission channel over time. Since these first and second symbols are already known in advance at the receiver end, there is no need for prior detection and demodulation either in order to make it possible to use them for compensation.

The first and second symbols which are used to determine the frequency offset and/or the change in the phase of the transmission channel over time can be determined in a simple manner with little effort, so that the frequency offset and/or the change in the phase of the transmission channel over time can be compensated for quickly and accurately. The method according to the invention thus makes it possible to use independent symbol pairs, which are known in advance and have a relatively long time interval between them within the data burst in a versatile manner for more exact and improved compensation.

Advantageously, only symbols that are known at the receiver end, and no data symbols, influence the first and second sample values. A further simplification and less complex and faster compensation can thus be carried out, since no data symbols need first of all be detected and demodulated.

The sample values that correspond to the first and second symbols are advantageously evaluated in order to compensate for the frequency offset and/or the change in the phase of the transmission channel over time.

It is preferable for the evaluated sample values, which correspond to the first and second symbols, to be used for estimation of the frequency offset and/or for the change in the phase of the transmission channel over time. The sample values, or sequences of sample values in the received signal, which correspond to these first and second symbols that are known at the receiver end are evaluated in order to estimate the frequency offset and/or in order to estimate the change in the phase of the transmission channel over time. These sample values or sequences of sample values are referred to for short in the following text as first and second sample values. The method according to the invention may, however, also be carried out without explicit estimation of the frequency offset and/or of the change in the phase of the transmission channel over time. The frequency offset can also be estimated implicitly by, for example, estimating any desired other variable which is linked to the frequency offset, in particular a variable which can be converted to a frequency offset, or an actual or apparent change in the channel characteristics over time which, inter alia, is based on the frequency offset. Where the expression estimation of a frequency offset is used, then this means not only explicit but also implicit estimates of the frequency error.

The first and second symbols are particularly advantageously transmitted as edge symbols at the start and at the end of a data burst. It is particularly advantageous for the first and second symbols, which are known in advance, to be transmitted as edge symbols at the start and at the end of a data burst and for the corresponding sample values, which are close to the edge, in particular their phase angles, to be evaluated in order to estimate the frequency offset and/or the change in the phase of the transmission channel over time. Since these edge symbols, which are transmitted at the two end points of a data burst, are used for estimation of the frequency offset and/or of the change in the phase of the transmission channel over time, it is possible to make use of the fact that an estimate such as this can be carried out more accurately the further the sample values which are used and evaluated are apart from one another within the data burst. The use of these sample values close to the edge results in the maximum possible time interval between first and second symbols that are known in advance. The estimation process based on the edge symbols can be implemented and carried out particularly easily. Furthermore, the use of the maximum feasible interval between the edge symbols that are transmitted at the end points of the data burst improves the quality of the estimation process and of the estimator of the one estimator that is used after equalization. The evaluation and use of edge symbols can be used in order to carry out a frequency error estimation process for any digital transmission system that operates with data bursts having defined edge symbols. For example, the 8-PSK-modulated data bursts which are used in the GSM mobile radio standard each comprise nine bits with the logic state "1", which are respectively represented as three edge symbols with the logic state "0" at the start and at the end of a data burst.

It has been found to be advantageous to transmit training symbols and/or pilot symbols and/or synchronization symbols and/or edge symbols which are arranged at the start of a data burst and/or edge symbols which are arranged at the end of a data burst as symbol types which are known at the receiver end, and to use them as first and second symbols which are known in advance. This allows a large number of combinations of symbols that are known in advance. It is also possible for the known training sequences which, if required, are transmitted by means of the data burst, and/or known pilot symbols and/or known synchronization symbols to be used on their own or, if required, in addition to the edge symbols for estimation of the frequency error. For example, it is thus possible to use edge symbols which are transmitted at the start of a data burst as first symbols which are known at the receiver end, and parts of a training sequence or an entire training sequence as an already known symbol pair to be used as second symbols which are known at the receiver end. In principle, all combinations of symbols that are known in advance and are separated from one another within a data burst may be used. This allows the estimate of the frequency error to be further improved and to be carried out more accurately.

Furthermore, a number of such combined pairs of first and second symbols may be used, or a number of such combined pairs of first and second sample values may be evaluated in order to compensate for or to estimate the frequency offset and/or the change in the phase of the transmission channel over time, with averaging, possibly weighted averaging, being carried out over the respective evaluation.

It has also been found to be advantageous for sample values of the received signal that corresponds to the first and second symbols to be evaluated for a carrier frequency that changes from data burst to data burst.

It is advantageous for a frequency offset and/or a change in the channel characteristics over time to be determined before equalization from the phase angles of those sample values of the received signal that correspond to the already known first and second symbols.

It is possible to provide for the frequency offset and/or the change in the phase of the transmission channel over time to be at least partially compensated for before equalization. However, it is also possible for the frequency offset and/or the change in the phase of the transmission channel over time to be at least partially compensated for during equalization.

It is preferable if the estimated data symbols, the data burst with the frequency offset which has been at least partially compensated before equalization or at least partially during equalization, and/or the change in the phase of the transmission channel over time, and the frequency offset estimated before equalization and/or the change in the transmission channel over time to be used for a further estimate of the frequency offset and/or of the change in the phase of the transmission channel over time, after equalization.

It is also possible to provide that the frequency offset and/or the change in the phase of the transmission channel over time is estimated once again after equalization as a function of the estimated data symbols, of the received data burst with the frequency offset at least partially compensated for and/or with the change in the phase of the transmission channel over time at least partially compensated for, before or during equalization, and of the frequency offset, which is used for the at least partial compensation, and/or for the change in the phase of the transmission channel over time, which is used for the at least partial compensation.

It is advantageous for the carrier-frequency, modulated data burst to be 8-PSK modulated, in particular in accordance with the GSM standard. In the case of the GSM mobile radio standard, 8-PSK modulation allows a very particularly simple embodiment of exact frequency error estimation. This improved compensation for a frequency offset and/or for a change in the phase of the transmission channel over time is, furthermore, also particularly suitable when a transmission channel has a relatively good signal-to-noise ratio, has little delay time spreading, and the frequency for 8-PSK modulation is estimated on the basis of the edge symbols, which are likewise known in advance in addition to the training sequence.

It has been found to be advantageous for the rotator exp $(j2\pi\Delta f_{est}TM)$ to be determined by the ratio $x_1^H x_r / |x_1|^2$ or mathematically equivalent expressions, where $x_1$ represents the sample values of the received signal which are associated with the received first already known symbols, $x_r$ characterizes the sample values of the received signal associated with the received second already known symbols, $\Delta f_{est}$ characterizes a frequency offset estimated before equalization, and TM characterizes the time interval between the first and second already known symbols, with a symbol duration T.

It is also possible to provide that the phase difference $\Delta\phi$ between the sample values of the received signal which are associated with already known first and second symbols is proportional to the expression $\Delta f_{est}TM$, where $\Delta f_{est}$ characterizes a frequency offset which was estimated before equalization and TM characterizes the time interval between the first and second already known symbols with a symbol duration T.

A receiving unit according to the invention is designed for reception of data symbols in carrier-frequency, modulated data bursts and for compensation, in particular for automatic compensation, for a frequency offset and/or for a change in the phase of the transmission channel over time, during mobile radio transmission. One major idea of the invention is that the receiving unit has means in order to compensate for the frequency offset and/or for the change in the phase of the transmission channel over time, with these means being designed such that the first and second symbols, which are arranged in a data burst with a defined phase angle and are separated from one another in the data burst, and which are known at the receiver end, corresponding main parts of the received signal are used to compensate for the frequency offset and/or for the change in the phase of the transmission channel over time.

It has been found to be advantageous for these means to be designed such that the sample values that correspond to the first and second symbols are evaluated in order to compensate for the frequency offset and/or for the change in the phase of the transmission channel over time.

The means are preferably designed such that the sample values that correspond to the first and second symbols, in particular the evaluated phase angles of the sample values, are used to estimate the frequency offset and/or the change in the phase of the transmission channel over time, before equalization.

It is possible to provide that the first and second symbols are training symbols and/or pilot symbols and/or synchronization symbols and/or edge symbols which are arranged at the start of a data burst, and/or edge symbols which are arranged at the end of a data burst.

It is possible to provide, in a preferred manner, that the means are designed such that the sample values that correspond to the first and second symbols are evaluated for a carrier frequency that changes from data burst to data burst.

It is possible to provide that the means are designed such that the frequency offset and/or the change in the phase of the transmission channel over time are/is at least partially compensated for before equalization, or at least partially during equalization.

In general, provision is made for the receiving unit to have a channel equalizer which uses the sample values whose frequency offset and/or whose change in the phase of the transmission channel over time have/has been compensated for to estimate the transmitted data symbols using the previously estimated channel characteristics.

It is possible to provide that the receiving unit has means for further estimation of a frequency offset and/or of a change in the phase of the transmission channel of the received data burst over time after equalization, with the means being designed such that the data symbols estimated by means of the channel equalizer, the data burst with the frequency offset which has been at least partially compensated for and/or with the change in the phase of the transmission channel over time which has been at least partially compensated for, and the frequency offset which was estimated before equalization, and/or the change in the phase of the transmission channel over time which was estimated before the equalization, are all used for further estimation.

The receiving unit may also have means for demodulation of PSK-modulated, in particular 8-PSK-modulated, data bursts.

It is advantageous for the rotator $\exp(j2\pi\Delta f_{est}TM)$ to be determined by the ratio $x_1^H x_r / |x_1|^2$, or mathematically equivalent expressions, where $x_1$ represents the sample values of the received signal which are associated with the received first already known symbols, $x_r$ characterizes the sample values of the received signal associated with the received second already known symbols, $\Delta f_{est}$ characterizes an estimated frequency offset, and TM characterizes the time interval between the first and second already known symbols, with a symbol duration T.

It is preferable if the phase difference $\Delta \phi$ between the sample values of the received signal which are associated with already known first and second symbols is proportional to the expression $\Delta f_{est}TM$, where $\Delta f_{est}$ characterizes a frequency offset which was estimated before equalization and/or a change in the phase of the transmission channel over time, and TM characterizes the time interval between the first and second already known symbols with a symbol duration T.

BRIEF DESCRIPTION OF THE DRAWINGS

One exemplary embodiment of the invention will be explained in more detail in the following text with reference to schematic drawings, in which.

DETAILED DESCRIPTION OF THE INVENTION

Figure 1:
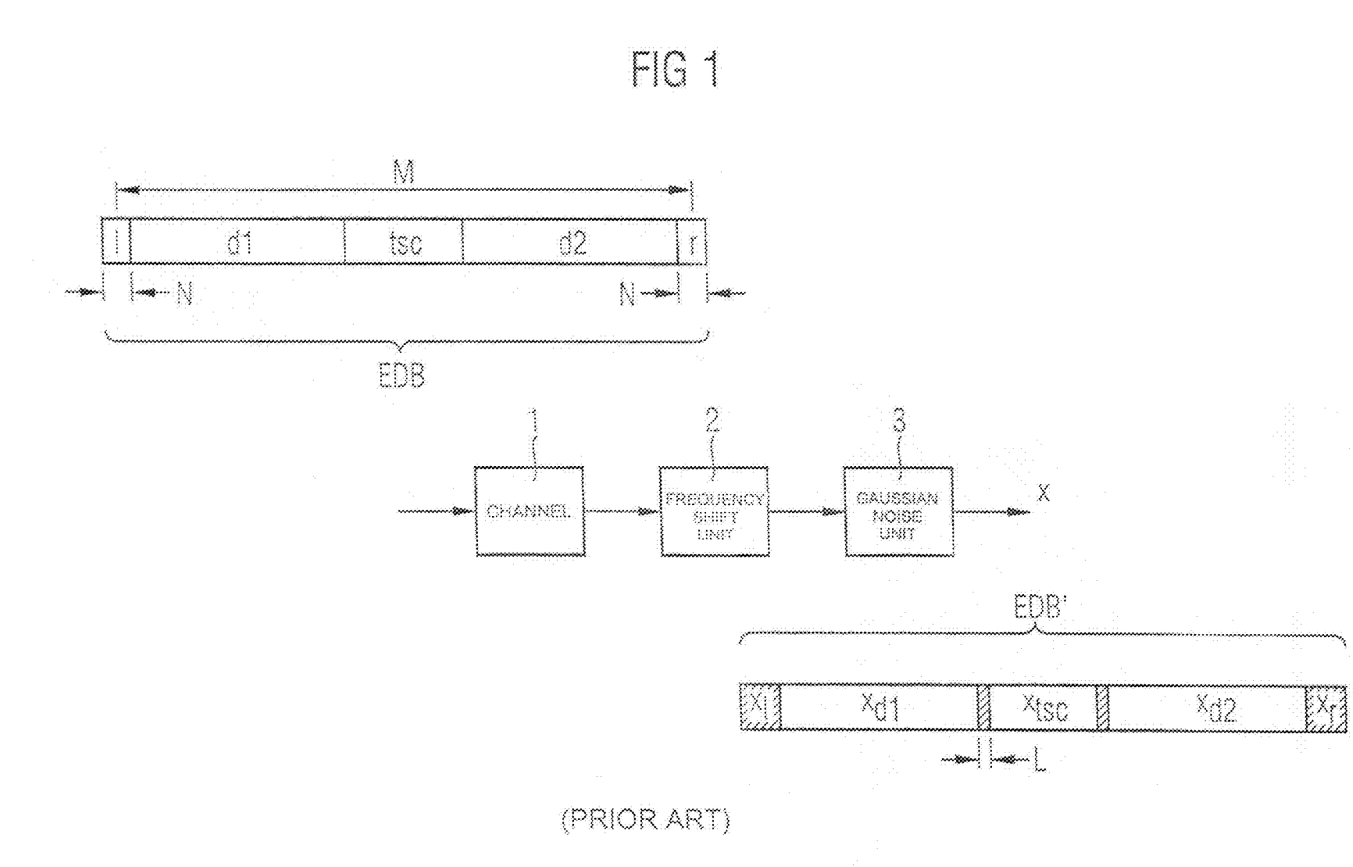
FIG. 1 shows a known channel model, and the layout of a signal burst for one mobile radio standard.

FIG. 1 shows a channel model, in a simplified form, with a channel 1, characterized by the channel coefficients h. The channel model also comprises a unit 2, which is connected downstream from the channel 1 and produces a frequency shift in the received sample values. The unit 2 is followed by a further unit 3, which adds white Gaussian noise. Furthermore, FIG. 1 shows a model of the layout of a signal burst in a mobile radio system that supports the GSM mobile radio standard. The transmitted data burst EDB represents a data burst that, for example, is transmitted by a base station. In the case of a TDMA system, which is related to the GSM standard, data bursts are transmitted as carrier-frequency, modulated signals via transmission channels from a mobile station to a base station, or vice versa. A transmission channel may in this case support up to 8 data bursts in one TDMA frame, with the data bursts being received and transmitted in time slots in a time pattern of a timeslot method, which is intended for transmission.

A normal data burst contains two packets d1 and d2, which each contain 58 data symbols. These two packets d1 and d2 include a training sequence tsc, which comprises 26 symbols. A number N of edge symbols or edge bits are attached to the start and to the end of each data burst, in particular with three edge symbols in each case being attached to each side of the data burst. M denotes the interval between the edge symbols 1 at the start of the data burst EDB and the edge symbols r at the end of the data burst EDB. In this example, M=58+26+58+3. The received data burst EDB' is produced at the output of the unit 3, and contains frequency-shifted, noisy sample values, which have been distorted by multipath propagation. In the transmitted data burst, only data symbols influence the sample values $x_{d1}$ and $x_{d2}$, only training symbols influence the sample values $x_{tsc}$, only the edge symbols 1 at the start of the transmitted data burst EDB influence the sample values $x_1$, and only the edge symbols r at the end of the transmitted data burst EDB influence the sample values $x_r$.

The different elements and sample values $x_{d1}$, $x_{d2}$, $x_{tsc}$, $x_1$ and $x_r$ are each bounded in the received data burst EDB' by intersymbol interference areas, which each have an essentially identical width L. L in this case denotes the order of the channel impulse response, or the channel memory.

Figure 2:
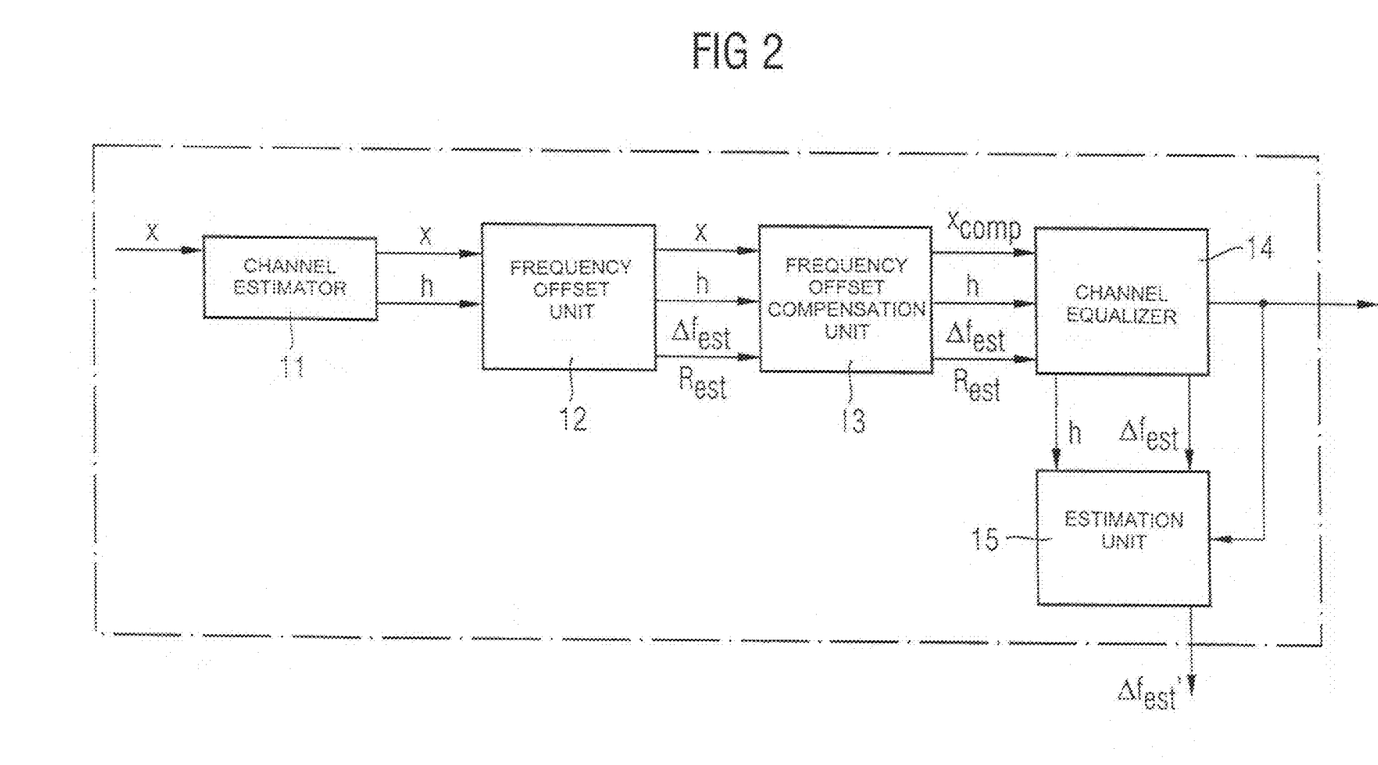
FIG. 2 shows a block diagram of the receiving unit according to the invention for mobile radio transmission.

A receiving unit according to the invention for mobile radio transmission is illustrated in the form of a block diagram in FIG. 2. The illustrated equalizer structure has units by means of which an estimate, which is produced before the equalization, can be produced for the frequency offset between the transmission and reception end, and/or a change in the phase of a transmission channel over time and, if required and in addition, a further estimate can be produced of a frequency offset and/or of a change in the phase of a transmission channel over time after equalization.

A received data burst is characterized by a received signal vector x with elements $x_k$. The received data burst is transferred to a channel estimator 11, with the channel estimator 11 determining channel coefficients h for modeling of a transmission channel. In order to make a frequency offset estimate and/or an estimate of a change in the phase of a transmission channel over time, the determined channel coefficients h and the received data burst with the received signal vector x are transferred to a unit 12 before equalization. Compensation for the frequency offset $\Delta f_{est}$, which is determined in the unit 12 and is estimated before equalization, and/or for the estimated change in the phase of a transmission channel over time is carried out in a unit 13. For this purpose, the channel coefficients h, the elements $x_k$ of the received signal vector x as well as the estimated frequency offset $\Delta f_{est}$ and/or the estimated change in the phase of the transmission channel over time are transferred to the unit 13. The received signal vector $x_{comp}$ with the frequency-corrected or phase-corrected elements $x_{k,comp}$, the channel coefficients h as well as the estimated frequency offset $\Delta f_{est}$ and/or the change in the phase of the transmission channel over time are transferred to a channel equalizer 14, which detects the received data from the phase-corrected sample values of the received signal vector $x_{comp}$. In FIG. 2, $R_{est}$ denotes an estimated rotator.

Furthermore, it is also possible to provide that, in addition to the frequency offset estimation before equalization, a frequency offset estimate is produced after equalization and/or in addition to the estimate of a change in the phase of a transmission channel over time is produced after equalization in addition to estimation of the change in the phase of transmission channel over time before equalization. For this purpose, the phase-corrected sample values of the received signal vector $x_{comp}$ that have been determined by the channel equalizer 14 and have been equalized are transferred to a unit 15, which is used to carry out the estimation process after equalization. Furthermore, the channel coefficients h as well as the frequency offset $\Delta f_{est}$ as estimated before equalization and/or the change in the phase of the transmission channel over time as estimated before equalization are used for this estimation after equalization. The unit 15 uses this to determine a frequency offset $\Delta f_{est}'$, which is estimated after equalization, and/or a change in the phase of the transmission channel over time, and these are transferred to a further frequency compensation unit, which is not illustrated. The estimation after equalization is used, for example, for frequency correction of subsequent received data bursts. If the frequency of a data burst after the first channel is shifted by a specific frequency offset after the first frequency estimation before equalization, the estimator is corrupted by this frequency offset after equalization. This is taken into account in the estimation after equalization. For example, the control voltage for voltage-controlled crystal oscillators is increased or decreased on the basis of the estimated frequency offset, for frequency correction.

The invention may be described in a particularly advantageous manner on the basis of the GSM radio standard, which forms the basis of the exemplary embodiment, is supported by the mobile radio system, and in which 8-PSK modulation is used. The essential feature in this case is that the edge symbols at the start of the received data burst, which are represented by the vector l, and the edge symbols at the end of the received data burst, which are represented by the elements of the vector r, are used for estimation of a frequency offset estimate. During this process, a check is first of all carried out to determine whether the received signal has been modulated with a modulation type for which frequency offset estimation and compensation can advantageously be used. As already mentioned, in the case of GSM mobile radio standard, this means that 8-PSK is used for modulation.

The channel impulse response is estimated for equalization. In general, it should be remembered that estimation errors occur during the channel estimation process. However, for simplicity, the discrepancy between the estimated and the actual channel impulse response h will be ignored here. Furthermore, during the channel estimation process that has been mentioned, a check is carried out to determine whether the physical channel has an adequate signal-to-noise ratio. This precondition or condition is only optional, and need not necessarily be carried out.

Furthermore, the previous channel estimate is used to check whether the physical channel has sufficiently little delay time spread. Little delay time spread means that the order L of the channel impulse response must be sufficiently small, or the number of edge symbols N which are known are sufficiently large, such that at least one received signal value, which is governed by the sampling, in each case exists, which is governed only by the channel impulse response or the channel coefficients h and the edge symbols, as well as unavoidable disturbances such as noise and/or interference from other connecting channels. One precondition is thus that the number of known edge symbols N must be greater than the order L of the channel impulse response h. If this precondition is not satisfied, it should at least be possible to approximate the channel impulse response such that this precondition is satisfied.

Based on the simplifying assumption that the first sample value close to the edge, at the burst start, is subject to the same phase shift as the last sample value, close to the edge, at the burst end for the sample values associated with the edge symbols of the received data burst, as a result of the frequency offset and/or the change in the phase of the transmission channel over time, and that the first sample value close to the edge at the burst end is subject to the same phase shift as the last sample value close to the edge at the burst end, this results approximately in the following relationship:

$$x_l = e^{-j\pi \Delta f TM} H\, l + n_l, \tag{F1a}$$

$$x_r = e^{+j\pi \Delta f TM} H\, r + n_r, \tag{F1b}$$

where l is an N×1 vector with the edge symbols transmitted at the start of the data burst. Furthermore, r denotes an N×1 vector with the edge symbols that are transmitted at the end of the data burst. In addition, H denotes an (N−L)×N matrix with the channel impulse response h in each row, which can be represented as follows:

$$H = \begin{bmatrix} h_L & \cdots & h_0 & & 0 \\ & \ddots & \ddots & \ddots & \\ 0 & & h_L & \cdots & h_0 \end{bmatrix} \tag{F2}$$

Furthermore, $x_l$ and $x_r$ each characterize (N−L)×1 vectors, whose components are sample values of the received signal which correspond to the edge symbols at the start and at the end, respectively, of the received data burst. When N=L+1, these vectors become scalars. The vectors $n_l$ and $n_r$ represent disturbances that are approximated by white random processes with a Gaussian distribution. In addition, $\Delta f$ denotes the frequency offset to be determined, and the expression TM denotes the time interval between the sample values contained in the vectors $x_l$ and $x_r$. The two matrix equations F1a and F1b result in an over defined equation system, which can be solved in a simple manner by various embodiments of the invention.

A first solution to the overdefined equation system mentioned above can be achieved by the method of directly minimizing the square error. The equations $$x^*_l = e^{+j\pi \Delta f TM} H^* l^* + n^*_l, \tag{F3}$$

$$x_r = e^{+j\pi \Delta f TM} H r + n_r \tag{F4}$$

are solved directly. In this case, "*" is the conjugation of the matrices without transposition.

The solution:

$$R_{est} = (e^{+j2\pi\Delta f TM})_{est} = (S^H S)^{-1} S^H X \tag{F5}$$

where $S^T = [(H^* l^*)^T (H r)^T]$ and $X^T = [x_1^H x_r^T]$ is already more efficient with respect to the value quality per amount of effort than the methods known from the prior art, since the interval between l and r is greater than the interval within a training sequence. In F5, "$H$" means the conjugation and the transposition of the matrices. Furthermore, "$T$" denotes the transposition of the substitution vector S. Since, by definition, the estimate does not have the magnitude 1, this may also need to be normalized.

A second, even simpler, procedure for solving the overdefined equation system mentioned above makes use of the gradient method. This gradient method is also known in the specialist literature as "Block LMS" Kammeyer, D.: "Nachrichtenübertragung" [Message transmission], B. G. Teubner-Verlag, Stuttgart, 1996), and is hereby incorporated by reference in its entirety. In this gradient method, an error for the sample values which are close to the edge and are contained at the start and at the end of the received data burst are defined as:

$$e_l(R_{est}) = e^{-j\pi\Delta f_{est}TM} H l - x_1 = (e^{-j\pi\Delta f_{est}TM} - e^{-j\pi\Delta f TM}) H l - n_l = (R^*_{est} - R^*) H l - n_1 \tag{F6}$$

$$e_r(R_{est}) = e^{+j\pi\Delta f_{est}TM} H r - x_r = (e^{-j\pi\Delta f_{est}TM} - e^{+j\pi\Delta f TM}) H r - n_r = (R_{est} - R) H r - n_r \tag{F7}$$

A substitution was carried out in the two formulae F6 and F7 such that the expression $\exp(j\pi\Delta f TM)$ was substituted by R, and $\exp(j\pi\Delta f_{est}TM)$ was substituted by $R_{est}$, in order to simplify the calculations described in the following text. The derivation of the sum of the squares of the magnitudes of the error vector based on the estimated rotator $R_{est}$ is:

$$\frac{\partial e_r}{\partial R_{est}} = H r \tag{F8}$$

$$\frac{\partial e_l}{\partial R_{est}} = H^* l^* \tag{F9}$$

$$\frac{\partial e_r^H e_r}{\partial R_{est}} = 2 e_r^H H r \tag{F10}$$

$$\frac{\partial (e_l^H e_l)}{\partial R_{est}} = \left( \frac{\partial (e_l^H e_l)}{\partial R^*_{est}} \right)^* = (2 e_l^H H l)^* \tag{F11}$$

$$\frac{\partial [e_l^H(R_{est}) e_l(R_{est}) + e_r^H(R_{est}) e_r(R_{est})]}{\partial R_{est}} = \tag{F12}$$

$$2 e_r^H(R_{est}) H r + (2 e_l^H(R_{est}) H l)^* =: \Delta R(R_{est})$$

Since no information about the frequency offset is available initially, an initialization process is carried out for the frequency offset, estimated before equalization, and for the estimated rotator, as described in the following text:

$$\Delta f_{est}^{(0)} = 0 \text{ and } R_{est}^{(0)} = 1 \tag{F13}$$

The superscript index in brackets in this case represents the iteration number.

An improved estimate of the rotator is provided by means of the simplified gradient method:

$$R_{est}^{(1)} = R_{est}^{(0)} - \mu \Delta R(R_{est}^{(0)}) = 1 - \mu \Delta R(R_{est}^{(0)}) \tag{F14}$$

This estimate of the rotator may also need to be normalized, since the estimate, by definition, does not have the magnitude 1. The step width $\mu$ is a parameter that may be fixed or may be chosen adaptively. Two or more iterations (normalized with "i") may likewise be carried out.

$$R_{est}^{(i+1)} = R_{est}^{(i)} - \mu \Delta R(R_{est}^{(i)}) \tag{F15}$$

Since, in this case, no matrix inversions need be carried out or are necessary, the estimated rotator $R_{est}$ can be determined with considerably less complexity than that relating to the solution in formula F5.

A further, third solution to the overdefined equation system specified in the formula F1a and F1b can be achieved by simple division. In this case, it should be noted that this leads to a particularly simple solution, particularly in the case of the GSM mobile radio standard. This simple embodiment or this simple solution can be obtained or used wherever the first and second already known symbols, in particular the edge symbols which are transmitted at the start and at the end of a data burst, are the same. This means that the edge symbol vector 1 is the same as the edge symbol vector r.

This embodiment or this solution is particularly advantageous for 8-PSK modulation and in the case of data bursts which are modulated using this modulation standard. This is because, in this situation, the edge symbols that are transmitted at the start and at the end of a data burst are equal to logic value "0". In the GSM receiver, this is true only after the so-called de-rotation, in which symbol-by-symbol rotation of the signal area at the transmission end is reversed. This solution or this embodiment can also additionally be used when the channel impulse response h is mirror-image symmetrical, and when the edge symbol vector 1 which is transmitted at the start of the data burst is a mirror image of the edge symbol vector r which is transmitted at the end of the data burst, even though the edge symbol vectors which are transmitted at the start and at the end of the data burst may not be the same. The following relationship between the received symbols which are associated with the edge symbols at the end of the data burst and the received symbols which are associated with the edge symbols at the start of the data burst now apply to these situations as described above:

where $$x_r = e^{+j2\pi\Delta f TM} x_{1r} + n_{lr} \tag{F16}$$

$$n_{lr} = n_r - e^{+j2\pi\Delta f TM} n_1 \tag{F17}$$

is likewise white Gaussian noise, and the solution, in the sense of the least square error, is given by the following expression:

$$(e^{+j2\pi\Delta fTM})_{est}=(x_l^H x_l)^{-1}x_l^H x_r=(x_l^H x_r)/|x_l|^2 \quad (F18)$$

Since $x_l^H x_l$ is scalar, no matrix inversion but a simple division should be carried out and is sufficient. In the case where N=L+1, this is even a pure complex division:

$$R_{est}=(e^{+j2\pi\Delta fTM})_{est}=x^*_l x_r/(x^*_l x_l)=x_r/x_l \quad (F19)$$

This solution approach results in a particularly simple expression for the estimated rotator $R_{est}$.

An arctan function, which can be approximated by a polynomial, is now required in order to make it possible to determine the phase angle:

$$2\pi\Delta f_{est}TM=\arctan(Im\{R_{est}\}/Re\{R_{est}\}) \quad (F20)$$

If the advantageous solution approach, as described above, with simple division is used for estimating the rotator R, then the division by $(x_l^H x_l)$ can also be omitted, with the phase angle instead being determined directly using the following expression:

$$\Delta\phi=2\pi\Delta f_{est}TM=\arctan(Im\{x_l^H x_r\}/Re\{x_l^H x_r\}) \quad (F21)$$

In this case as well, only a single division is still required and needs be carried out. The phase offset determination process is then only a resealing process, and is given by the following expression:

$$\Delta f_{est}=\Delta\phi\cdot 1/(2\pi TM) \quad (F22)$$

In this case, $1/(2\pi TM)$ is a simple constant.

Furthermore, it may be worthwhile restricting the value range of the frequency offset or frequency error, $\Delta f_{est}$, that is to say to provide saturation for the frequency and the phase angle, or not to correct the frequency if the estimation results are not plausible. For $\Delta\phi \approx \pi$ or more, the mathematical sign of the frequency error cannot in fact be estimated reliably, and the arctan function can be used sensibly only when:

$$|\Delta\phi|<\pi/2 \quad (F23)$$

In the case of the GSM mobile radio standard, this means a frequency error that is less than 467 Hz. It should be noted that, in this case, it may be helpful to take account of the phase angle of the midamble in addition to the phase angles of the edge symbols which are transmitted at the start and at the end. It may also be advantageous in the determination of $\Delta\phi$ using $\arctan(Im\{x_l^H x_r\}/Re\{x_l^H x_r\})$ to additionally evaluate the quadrant in which the complex number $x_{lx}^H x_r$ is located, and, if it is located in the second quadrant, to increase the result of the arctan by $\pi$ and, if it is in the third quadrant, to reduce it by $\pi$. Alternatively, the argument function can also be used to determine the angle $\Delta\phi=\arg(x_l^H x_r)$. One critical value for the determination of the estimated frequency offset using the method occurs when the phase angle is: $\Delta\phi\approx 2\pi$. In order to resolve ambiguities and lack of clarity, it is, for example, possible to make a first rough frequency offset estimate within the midamble. Frequency offset estimation based on the edge symbols can further improve the accuracy.

Once an estimated frequency offset $\Delta f_{est}$ has been determined on the basis of the above statements, before equalization, compensation for the frequency offset can be carried out. The estimated rotator R is normalized such that its magnitude is equal to unity. The compensation process for the data is carried by complex multiplication of the K data items $x_{-K/2}, \ldots, x_{+K/2-1}$ in the data burst by the normalized estimated rotator R:

$$x_{k,comp}:=R^{k/M}x_k \quad (F24).$$

In this case, the following simplification is possible for the estimated rotator based on the solution approach of the gradient method:

$$R^{k/M}\approx 1-k/M\cdot\mu\Delta R(l) \quad (F25)$$

and the following simplification is possible using the phase angle $\Delta\phi$, for example based on the equation F21:

$$R^{k/M}\approx 1+jk\Delta\phi/M=1+jk\rho mit\ \rho-\Delta\phi/M$$

$$x_{k,comp}:=X_k+jk\rho\cdot x_k \quad (F26)$$

If this is implemented on a signal processor, then it may in contrast be more advantageous to carry out the compensation for the frequency offset directly by complex multiplication by the estimated rotator $R^{k/M}$. The values for this estimated rotator $R^{k/M}$ are in this case stored in a table for a set of frequencies. In this case, the estimation of the frequency and of the frequency offset can likewise be considerably simplified. This is because, with this procedure, the change in the phase angle $\Delta\phi$ need be associated only with one specific interval, and the association may then be made in a corresponding manner via the argument of the arctan function, for example $(Im\{x_l^H x_r\}/Re\{x_l^H x_r\})$, using the equation F21, without any need to calculate the arctan.

One very particularly preferred exemplary embodiment is possible by the following combination of the procedures described above:

The determination of the estimated rotator $R_{est}$ is carried out by simple division, and can be described in a particularly simple manner by the expression in the formula F19. Furthermore, the phase angle and the change in the phase angle $\Delta\phi$ are determined using the expression in the formula F21. In addition, in the case of this particularly advantageous exemplary embodiment, the frequency error $\Delta f_{est}$ as estimated before equalization is determined using the formula F22, and is taken into account in the frequency estimation after equalization. Furthermore, the compensation for the frequency offset, as estimated before equalization, is in this case carried out in a particularly advantageous manner on the basis of the representation in the formula F26.

In addition to this particularly preferred exemplary embodiment, further embodiments may alternatively be carried out. In this context, it should be noted that it is not absolutely necessary to carry out the frequency correction before the actual equalization. In this context, it is also possible to provide for the frequency correction to be carried out during the equalization, for example together with channel tracking that takes place during the equalization process. It is also possible to provide for the channel tracking to be carried out after the equalization of each individual symbol, or else block-by-block after the equalization of an entire symbol segment. In this procedure, it is possible to provide for the symbols that have already been equalized also to be used for estimation of the frequency correction. This can be carried out in particular when the estimated rotator Rest is determined based on the formula F15 by means of the gradient method for solving the equation system. Furthermore, this embodiment can also be carried out by not explicitly estimating the frequency offset but, in fact, by using a procedure such as this in which the edge symbols are also included in the channel tracking. This embodiment should also be regarded as an embodiment in which frequency estimation and frequency correction are carried out before equalization, using the readjusted channel-equalized symbols.

In the most general case, the method according to the invention allows compensation for a frequency error or for a frequency offset between a transmission frequency and reception frequency, and/or for the change in the phase of the transmission channel over time, particularly in the case of mobile radio transmission of radio-frequency, modulated signals, such that symbol pairs which are known at the receiver end are evaluated, and the evaluated sample values which correspond to these symbol pairs are used for estimation of or compensation for the frequency offset and/or the change in the phase of a transmission channel over time. The symbol pairs which are known at the receiver end are transmitted by means of a carrier-frequency, modulated data burst and arranged separated from one another within the data burst, that is to say not cohesively and effectively not immediately adjacent. The relatively long distance and the relatively long time interval between these symbols within the data burst also make it possible, if applicable, to determine any phase difference between these sample values which correspond to already known symbols in a symbol pair or to two or more symbol pairs. These already known symbols, which are not data symbols, may be arranged in a particularly advantageous manner as edge symbols at the start and at the end of the received data burst. Training symbols and/or pilot symbols and/or synchronization symbols may also be used as already known first and second symbols or symbol pairs.

It is also possible to provide for edge symbols which are used as first symbols at the start of a data burst to be used as symbol pairs which are known at the receiver end, and for parts of a training sequence or the entire training sequence which is contained in a data burst to be used as second symbols which are known at the receiver end, and to evaluate the corresponding received sample values.

It is possible to provide for use of parts of the training sequence, or else of the entire training sequence, and the edge symbols at the end of a data burst for estimation of a frequency error. The number of edge symbols used is or should be equal to the number of symbols used from the training sequence. Furthermore, a combination of the procedures described above can also be carried out, with the partial results that are obtained being averaged. The averaging process can be carried out with a different weighting, with partial results advantageously being weighted more strongly the greater the interval between the associated first and second symbols.

It is also possible to provide for other data, possibly data for other symbols which are known at the receiver end and which may be present in the received or receivable data and in particular in a data burst, for example pilot symbols and/or synchronization symbols, to be used on their own or in conjunction with edge symbols as first and second symbols, which are preferably combined as symbol pairs. A large number of combinations are therefore possible for the method according to the invention, in order to generate or to select already known symbol pairs and to evaluate them for frequency offset estimation. The only important factor is the that the symbol pairs are known in advance and are separated from one another in the data burst, in particular with a relatively large separation.

The method is particularly advantageous when the receiving unit demodulates 8-PSK-modulated data symbols. This 8-PSK modulation uses a signal area with 8-stage data symbols. The phase separation between adjacent signal area points is therefore 45°. The use of the method according to the invention for frequency offset correction with 8-PSK modulation can considerably reduce the phase errors, and thus allow a considerably lower error rate during demodulation. In contrast to the situation with previous GMSK modulation in the GSM mobile radio standard, there is no differential preceding of the symbols in 8-PSK modulation, so that the phase difference between the edge symbols at the data burst start and the edge symbols of the data burst end is already known before the detection of the data symbols. In this situation there is therefore no need for any decoding to be carried out in advance.

It is also possible to provide for the method according to the invention for correction of a frequency offset and/or a change in the phase of a transmission channel over time to be used in a data burst in which the data symbols are demodulated or decoded in a receiving unit based on the GSM/EDGE standard. EDGE is an extension of the GSM standard, in which the 8-PSK modulation is used in addition to the GMSK modulation. The method according to the invention for frequency correction makes it possible to particularly effectively eliminate and correct frequency offsets and/or changes in the phase of a transmission channel over time.

A summary list of the symbols used is also attached in the following text:

$d_1$ Vector of the transmitted data symbol in the first or left half burst (seen from the start of the burst)
$d_2$ Vector of the transmitted data symbols in the second or right half burst (seen from the start of the burst)
e Euler number
$e_l$ Error in the left edge symbols (discrepancy between the received data and the channel model)
$e_r$ Error in the right edge symbols (discrepancy between the received data and the channel model)
$\Delta f$ Actual frequency error
$\Delta f_{est}$ Frequency error estimated before equalization
$\Delta f_{est}'$ Frequency error estimated after equalization
h Vector of the channel impulse response with elements $h_0$ to $h_L$
I Iteration number
H (N−L)×N matrix for convolution of the transmitted edge symbols with the channel impulse response
k Sequential variable
K Number of data items in a received burst
j $j^2 = -1$
l Vector of the transmitted edge symbols on the left-hand side
L Order of the channel impulse response, h has L+1 elements
$n_l$ Additive white Gaussian noise on $x_l$
$n_r$ Additive white Gaussian noise on $x_r$
$n_{l'} n_r - e^{+j2\pi\Delta fTM} n_l$
M Interval in symbols between the first (left) edge symbol on the left-hand side and the first (left) edge symbol on the right-hand side
N Number of edge symbols on each side
r Vector of the transmitted edge symbols on the right-hand side
R Rotator $e^{+j2\pi\Delta fTM}$
$R_{est}$ Estimated rotator
$\Delta R_l$ Iteration step determined by the block LMS over the left sample values near the edge
$\Delta R_r$ Ditto for the right sample values near the edge
S Substitution for $[(H^*l^*)^T (H r)^T]$
T Symbol duration
x Received signal vector with elements $x_k$
$x_{comp}$ Received signal vector with frequency-corrected element $X_{k,comp}$
$x_{d1}$ Sample values of the received signal which depend only on the data symbols in the first half burst
$x_{d2}$ Ditto in the second half burst
$x_l$ Sample values of the received data burst which are associated with the edge symbols on the left-hand side
$x_r$ Sample values of the received data burst which are associated with the edge symbols on the right-hand side
$x_{tsc}$ Sample values which depend only on training symbols X Combining vector for $x_l$ and $x_r$
μ Stepwidth
Δϕ Estimated phase difference between the left and right sample values close to the edge
ρ Δϕ/M Although the invention has been illustrated and described with respect to one or more implementations, alterations and/or modifications may be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. Method for receiver-end compensation for a frequency offset or for a change in the phase of the transmission channel over time during mobile radio transmission of data symbols, comprising:
   configuring a data burst prior to transmission with first and second symbols that are known at a receiver end, the first and second symbols having a defined phase angle and being arranged separate from one another in the data burst;
   transmitting the data burst containing the data symbols to the receiver end; and
   using parts of the transmitted data burst at the receiver end that correspond to the first and second symbols to compensate for the frequency offset or for the change in the phase of the transmission channel over time in the respective received data burst;
   wherein the frequency offset is determined by solving an equation system based on a channel impulse response and a number of known edge symbols;
   and wherein the number of known edge symbols is greater than the order of the channel impulse response.

2. The method according to claim 1, wherein the sample values that correspond to the first and second symbols comprise phase angles of the first and second symbols, and are used to estimate the frequency offset or the change in the phase of the transmission channel over time.

3. The method according to claim 1, wherein the first and second symbols are transmitted as edge symbols at a start and at an end of the data burst.

4. The method according to claim 1, wherein training symbols or pilot symbols or synchronization symbols or edge symbols are arranged at a start of the data burst or edge symbols are arranged at an end of the data burst, and are transmitted as symbol types that are known at the receiver end, and are used as already known symbols thereat.

5. The method according to claim 1, wherein the frequency offset or the change in the channel characteristics over time are compensated for before an equalization from the phase angles of sample values of the transmitted data burst that correspond to the already known first and second symbols at the receiver end.

6. The method according to claim 1, wherein the frequency offset or the change in the phase of the transmission channel over time are at least partially compensated for before an equalization of the transmission channel.

7. The method according to claim 1, wherein the frequency offset or the change in the phase of the transmission channel over time are at least partially compensated for during an equalization of the transmission channel.

8. The method according to claim 1, wherein the data symbols, the data burst with the frequency offset or the change in phase of the transmission channel over time that has been compensated for is used as a frequency offset estimate before an equalization and are used for a further estimate of the frequency offset or of the change in the phase of the transmission channel over time, after the equalization.

9. The method according to claim 8, wherein the frequency offset or the change in the phase of the transmission channel over time is estimated after the equalization as a function of the data symbols, of the received data burst with the frequency offset or with the change in the phase of the transmission channel over time at least partially compensated for, and of the frequency offset that is used for the at least partial compensation or for the change in the phase of the transmission channel over time that is used for the at least partial compensation.

10. The method according to claim 1, wherein the data burst comprises 8-PSK modulated data in accordance with the GSM Standard.

11. The method according to claim 1, further comprising:
   evaluating sample values that correspond to the first and second symbols in order to compensate for the frequency offset or for the change in the phase of the transmission channel over time.

12. The method according to claim 11, wherein the sample values that correspond to the first and second symbols in the received signal are evaluated for a carrier frequency that changes from data burst to data burst.

13. The method of claim 1, wherein the edge symbols of the equation system are subject to an identical phase shift.

14. The method according to claim 1, wherein the equation is solved by minimizing a square error or by applying a gradient method.

15. A receiving unit for the reception of data symbols in carrier-frequency, modulated data bursts and for compensation thereof for a frequency offset or for a change in the phase of a transmission channel over time during mobile radio transmission, comprising:
   compensating means for compensating for the frequency offset or for the change in the phase of the transmission channel over time, such means operable to evaluate first and second symbols that are arranged in a data burst received by the compensating means, the first and second symbols having a defined phase angle and separated from one another in the data burst;
   wherein the compensating means is configured to determine the frequency offset by solving an equation system based on a channel impulse response and a number of known edge symbols;
   and wherein the number of known edge symbols is greater than the order of the channel impulse response.

16. The receiving unit according to claim 15, wherein the compensating means is configured to evaluate phase angles of the sample values, and use the evaluated phase angles to estimate the frequency offset or the change in the phase of the transmission channel over time before an equalization of the transmission channel.

17. The receiving unit according to claim 15, wherein the first and second symbols comprise training symbols or pilot symbols or synchronization symbols or edge symbols that are arranged at a start of the data burst, or edge symbols that are arranged at an end of the data burst.

18. The receiving unit according to claim 15, further comprising means for determination of characteristics of the transmission channel, operable to determine channel coefficients for a modeling of the transmission channel.

19. The receiving unit according to claim 15, wherein the compensating means is configured to compensate for the frequency offset or the change in the phase of the transmission channel over time at least partially before an equalization, or at least partially during an equalization of the transmission channel.

20. The receiving unit according to claim 19, further comprising a channel equalizer configured to use sample values that correspond to the first and second symbols whose frequency offset or whose change in the phase of the transmission channel over time has been compensated for to estimate the transmitted data symbols using previously estimated channel characteristics.

21. The receiving unit according to claim 20, further comprising means for further estimation of a frequency offset or of a change in the phase of the transmission channel of the received data burst over time after equalization, wherein with the means for further estimation is configured to use the data symbols estimated by means of a channel equalizer, the data burst with the frequency offset that has been at least partially compensated for or with the change in the phase of the transmission channel over time which has been at least partially compensated for, and a frequency offset which was estimated before the equalization, or the change in the phase of the transmission channel over time which was estimated before the equalization, for the further estimation.

22. The receiving unit according to claim 15, further comprising a means for demodulation of PSK-modulated data bursts.

23. The receiving unit of claim 15, wherein the edge symbols of the equation system are subject to an identical phase shift.

* * * * *